US010783315B2

(12) United States Patent
Yoo et al.

(10) Patent No.: US 10,783,315 B2
(45) Date of Patent: Sep. 22, 2020

(54) CONTEXTUALLY SENSITIVE SUMMARY

(71) Applicant: Microsoft Technology Licensing, LLC, Redmond, WA (US)

(72) Inventors: Dong Hwi Yoo, Issaquah, WA (US); Philipp Anatolievich Cannons, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 577 days.

(21) Appl. No.: 15/491,269

(22) Filed: Apr. 19, 2017

(65) Prior Publication Data

US 2018/0173682 A1 Jun. 21, 2018

Related U.S. Application Data

(60) Provisional application No. 62/435,073, filed on Dec. 15, 2016.

(51) Int. Cl.
*G06F 17/22* (2006.01)
*G06F 17/27* (2006.01)
(Continued)

(52) U.S. Cl.
CPC ........ *G06F 40/134* (2020.01); *G06F 16/9535* (2019.01); *G06F 40/205* (2020.01);
(Continued)

(58) Field of Classification Search
CPC .............. G06F 17/2235; G06F 16/9535; G06F 17/2705; H04L 51/10; H04L 51/18; H04L 67/306; H04L 67/02
See application file for complete search history.

(56) References Cited

U.S. PATENT DOCUMENTS 6,029,141 A * 2/2000 Bezos ............... G06Q 20/0855
705/26.41
6,269,369 B1 * 7/2001 Robertson .............. G06Q 10/02
(Continued)

OTHER PUBLICATIONS

"Use Mail on your Mac", Published on: May 24, 2016 Available at: https://support.apple.com/en-in/HT204093.
(Continued)

*Primary Examiner* — Stephen S Hong
*Assistant Examiner* — Ahamed I Nazar
(74) *Attorney, Agent, or Firm* — Merchant & Gould (57) ABSTRACT

Systems and methods for providing an enriched link interface are discussed herein. The system identifies a link within an electronic document to a content item such as a webpage or a document. The content item is accessed via the link and content data from the content item is retrieved. The system also retrieves contextual information about a user. The contextual information about the user and the content item are used to generate a contextually sensitive summary of the content item. Thereafter, the system modifies the electronic document to include an enriched link interface comprising the link and contextually sensitive summary. Accordingly the system optimizes the display of the electronic document to display an enriched link interface including additional information such as a contextually sensitive summary of the content item, which reduces a user's need to access the link thereby conserving computing resources and network bandwidth.

20 Claims, 9 Drawing Sheets

(51) Int. Cl.
*G06F 16/95* (2019.01)
*H04L 12/58* (2006.01)
*H04L 29/08* (2006.01)
*G06F 40/134* (2020.01)
*G06F 16/9535* (2019.01)
*G06F 40/205* (2020.01)

(52) U.S. Cl.
CPC .............. *H04L 51/10* (2013.01); *H04L 51/18* (2013.01); *H04L 67/306* (2013.01); *H04L 67/02* (2013.01)

(56) References Cited

U.S. PATENT DOCUMENTS

| | | | |
|---|---|---|---|
| 6,853,982 B2* | 2/2005 | Smith | G06Q 30/0603 705/26.7 |
| 7,310,633 B1 | 12/2007 | Wang et al. | |
| 7,356,490 B1* | 4/2008 | Jacobi | G06Q 30/0601 705/26.8 |
| 7,917,591 B2 | 3/2011 | Vakkalanka | |
| 8,245,135 B2 | 8/2012 | Cai et al. | |
| 8,510,285 B1 | 8/2013 | Stekkelpak | |
| 8,687,941 B2 | 4/2014 | Dirik et al. | |
| 8,738,733 B1* | 5/2014 | Walters | G06F 16/972 709/218 |
| 8,832,205 B2 | 9/2014 | Nelson et al. | |
| 9,077,672 B2 | 7/2015 | Khoo | |
| 9,083,665 B2 | 7/2015 | Naftali-Menajed | |
| 9,240,968 B1 | 1/2016 | Johnson | |
| 9,508,078 B1* | 11/2016 | Traub | G06Q 30/02 |
| 2009/0164400 A1* | 6/2009 | Amer-Yahia | G06Q 50/01 706/45 |
| 2010/0169264 A1* | 7/2010 | O'Sullivan | G06Q 10/10 706/52 |
| 2011/0238524 A1* | 9/2011 | Green | G06Q 30/0601 705/26.7 |
| 2012/0030552 A1 | 2/2012 | Zilberman-Kubovsky et al. | |
| 2014/0123165 A1* | 5/2014 | Mukherjee | H04N 21/44222 725/14 |
| 2015/0106349 A1 | 4/2015 | Kitamom et al. | |
| 2015/0168150 A1* | 6/2015 | Kahn | H04W 4/21 701/408 |
| 2015/0278234 A1* | 10/2015 | Masterson | G06F 16/9577 715/234 |
| 2016/0065511 A1 | 3/2016 | Ganin et al. | |
| 2016/0241499 A1 | 8/2016 | Hailpern et al. | |

OTHER PUBLICATIONS

Daniels, Meghan, "Embedding Video in Email—A Comprehensive Guide", Published on: Mar. 30, 2015 Available at: http://resources.goanimate.com/marketing/embed-video-email.

Ulrich, Jan, "Supervised Machine Learning for Email Thread Summarization", In Thesis of the University of British Columbia, Sep. 2008, 82 pages.

"International Search Report and Written Opinion Issued in PCT Patent Application No. PCT/US2017/065215", dated Jun. 7, 2018, 11 pages.

* cited by examiner

CONTEXTUALLY SENSITIVE SUMMARY

CROSS-REFERENCES TO RELATED APPLICATIONS

This application claims benefit of U.S. Provisional Patent Application No. 62/435,073 titled "CONTEXTUALLY SENSITIVE SUMMARY" filed on Dec. 15, 2016, the entirety of which is hereby incorporated by reference.

BACKGROUND

Users send and receive enormous amounts of electronic communications. Oftentimes, these electronic communications include links to various content items. However, the format and/or style of the link can vary greatly depending on whether the link has associated text. Accordingly, it is hard for a user to judge the relevance of the content referred to by the hyperlink just by viewing the hyperlink. A user may decide to open the hyperlink only to find out, for example, that the content was a joke. Alternatively, the user may not click on the hyperlink and may miss accessing relevant and important information.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Aspects of systems and methods for providing an enriched link interface are discussed herein. The system identifies a link within an electronic document to a content item such as a webpage or a document. The content item is accessed via the link and content data from the content item are retrieved. The system also retrieves contextual information about a user. The contextual information about the user and the content item are used to generate a contextually sensitive summary of the content item. Thereafter, the system modifies the electronic document to include an enriched link interface comprising the link and contextually sensitive summary.

Accordingly, the system optimizes the display of the electronic document to display an enriched link interface including additional information, such as a contextually sensitive summary of the content item. Further, by optimizing the interface, the system conserves computing resources and network bandwidth by providing the user with customized information presented in a user specific format such that the user is not required to access the link for investigation purposes.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of systems and methods for providing an enriched link interface are discussed herein. The system identifies a link within an electronic document to a content item such as a webpage or a document. The content item is accessed via the link and content data from the content item are retrieved. The system also retrieves contextual information about a user. The contextual information about the user and the content item are used to generate a contextually sensitive summary of the content item. Thereafter, the system modifies the electronic document to include an enriched link interface comprising the link and contextually sensitive summary.

Accordingly, the system optimizes the display of the electronic document to display an enriched link interface including additional information, such as a contextually sensitive summary of the content item. Further, by optimizing the interface, the system conserves computing resources and network bandwidth by providing the user with customized information presented in a user specific format such that the user is not required to access the link for investigation purposes.

Figure 1:
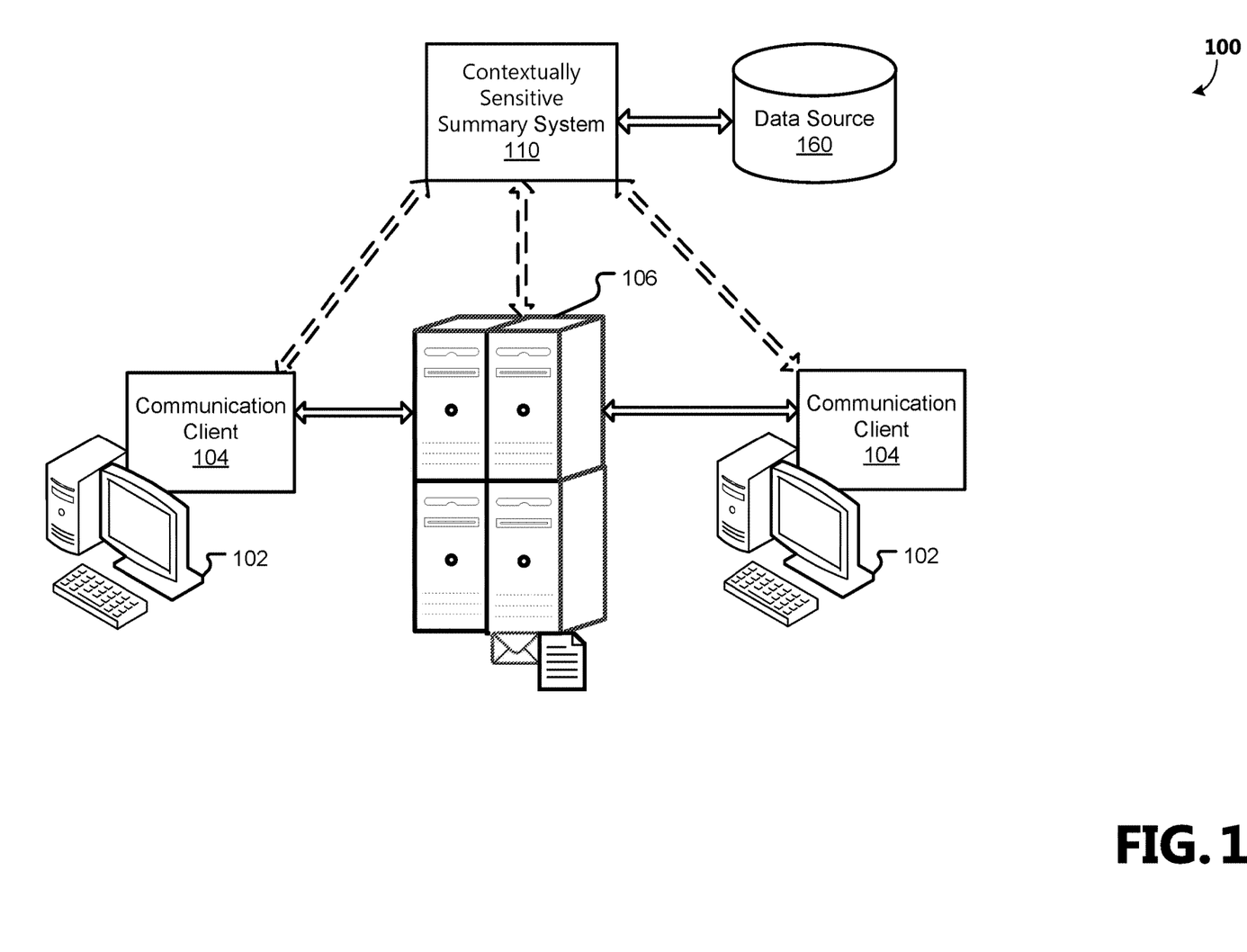
FIG. 1 is a block diagram of a system for providing an enriched link interface.

FIG. 1 is a block diagram of a system 100 for providing an enriched link interface. As illustrated, a computing device 102 is running a communication client 104, which communicates with the communication server 106 to send and receive communications. Various servers and intermediaries may lie between the computing device 102 and the communication server 106 to route the communications between the sender and the recipient. The communication server 106 is an application or service which is able to provide electronic communications including, without limitation: MICROSOFT OUTLOOK® (offered by Microsoft Corp. of Redmond, Wash.), GMAIL® (offered by Alphabet, Inc. of Mountain View, Calif.), THUNDERBIRD® (offered by the Mozilla Fnd of Mountain View, Calif.), etc.

According to one aspect, the communication server 106 is in communication with a contextually sensitive summary system 110. For example, upon receiving an electronic communication from the communication client 104, the communication server 106 communicates with the contextually sensitive summary system 110 to generate the enriched link interface including the contextually sensitive summary of the content item and to modify the electronic communication during transmission from the communication server 106. Further, it should be noted that the contextually sensitive summary system 110 may be a separate system accessed by the communication client 104 or integrated into the functionality of the communication server 106.

According to one aspect, the communication client 104 on the computing device 102 is in communication with a contextually sensitive summary system 110. For example, when the communication client 104 is generating an electronic communication, the communication client 104 communicates with the contextually sensitive summary system 110 to generate the enriched link interface including the contextually sensitive summary of the content item and to modify the electronic communication during transmission from the communication server 106. Further, it should be noted that the contextually sensitive summary system 110 may be a separate system accessed by the communication client 104, a plug-in installed into the communication client 104, or otherwise integrated into the functionality of the communication client 104.

The contextually sensitive summary system 110 is operable to identify a link to a content item and retrieve contextual information about the user, such as for example, the user's: profile data, data on link usage, email sending patterns, contacts data, interaction data on received electronic documents, and the like.

The contextually sensitive summary system 110 is in communication with a data source 160. The contextually sensitive summary system 110 is operable to retrieve content data of the content item referred to by the link from the data source 160. The contextually sensitive summary system 110 is configured to capture various types of content data including text, images, audio, video, metadata, etc. The contextually sensitive summary system 110 is further operable to generate a contextually sensitive summary based on the retrieved content data about the content item and retrieved contextual information about the user.

According to one aspect, the contextually sensitive summary system 110 may utilize a predictive model provided by the data source 160. It should be recognized that the data source 160 may include other forms of artificial intelligence or machine learning. In one example, the predictive model is configured to provide information relating to the user's preferences for the contextually sensitive summary including, for example, content types, formatting, layout, etc. In another example, the predictive model is configured to provide the contextually sensitive summary. Thus, the predictive model may provide one or more predictive results, such as a contextually sensitive summary preferences and/or a contextually sensitive summary in response to receiving a respective request.

Further, the contextually sensitive summary system 110 is configured to provide an enriched link interface for display on the user's device 102. By providing the enriched link interface, the contextually sensitive summary system 110 provides the user with the customized snippet of the content item before having the user actually access the content via the link. In one aspect, by providing the enriched link interface, the contextually sensitive summary system 110 provides the user with sufficient details, reducing the user's need to access the content item, thereby saving network bandwidth.

Figure 2:
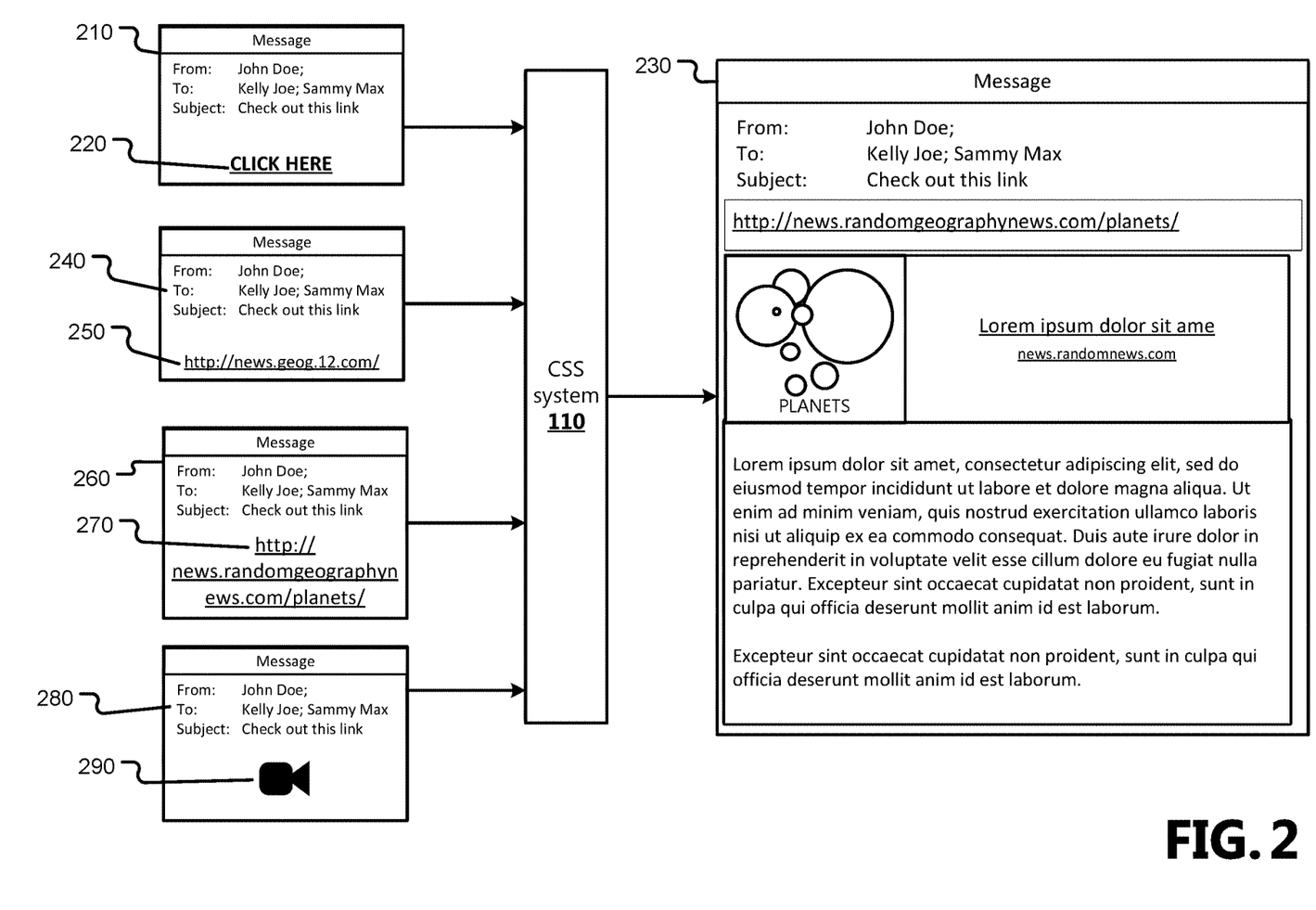
FIG. 2 is an illustration of an example graphical user interface in which an enriched link interface is implemented.

FIG. 2 is an illustration of an example graphical user interface in which an enriched link interface is implemented. In various aspects, as illustrated in FIG. 2, the contextually sensitive summary system 110 identifies a link in an electronic document. In the illustrated examples, the electronic document is depicted as an email.

More specifically, FIG. 2 illustrates multiple emails that include various types of links to the same content item that are utilized by the contextually sensitive summary system 110 (illustrated as the CSS system) to generate a contextually sensitive summary. In a first email 210, the contextually sensitive summary system 110 identifies a "click here" link 220, which does not provide any information about the source or the referenced content item. In a second email 240, the contextually sensitive summary system 110 identifies a shortened URL link 250. The link 250 in the second email 240 partially indicates the source of the content item but does not provide information about the referenced content item. In a third email 260, the contextually sensitive summary system 110 identifies a URL link 270. The link 270 in the third email 260 indicates the source of the content item but does not provide information about the referenced content item. In a fourth email 280, the contextually sensitive summary system 110 identifies a link 290 associated with an image/icon. The link 290 indicates no information about the source or the referenced content item.

The contextually sensitive summary system 110 retrieves the content data from the content item that is referenced by the links 220, 250, 270, 290 along with the contextual data about the user. For example, if the user "Kelly Joe" receives the one of the emails 210, 240, 260, 280 with a link 220, 250, 270, 290 the contextually sensitive summary system 110 retrieves the contextual information about the user "Kelly Joe". For example, the contextual data about the user may include information relating to the user's profile data, the user's data on link usage, the user's email sending patterns, the user's contacts data, the user's interaction data on received electronic documents, and the like.

The contextually sensitive summary system 110 generates a contextually sensitive summary based on the retrieved content data about the content item referenced by the link 220, 250, 270, 290 and the contextual information about the user.

The contextually sensitive summary system 110 further provides an enriched link interface 230. The enriched link interface 230 provides the user with the customized snippet of the content item referred to by the link 220, 250, 270, 290, thereby reducing the likelihood that the user will actually access the link 220, 250, 270, 290. In one example, as illustrated in FIG. 2, the enriched link interface 230 includes the link 270 and the contextually sensitive summary.

In one aspect, when the email 210, 240, 260, 280 including the link 220, 250, 270, 290 is received by the user "Sammy Max", the contextually sensitive summary is based on the content data of the content item referenced by the link 220, 250, 270, 290 and the contextual data about the user "Sammy Max". Accordingly the enriched link interface 230, provided by the contextually sensitive summary system 110, to the user "Kelly Joe" may be completely different from the enriched link interface 230 for the user "Sammy Max".

Figure 3A:
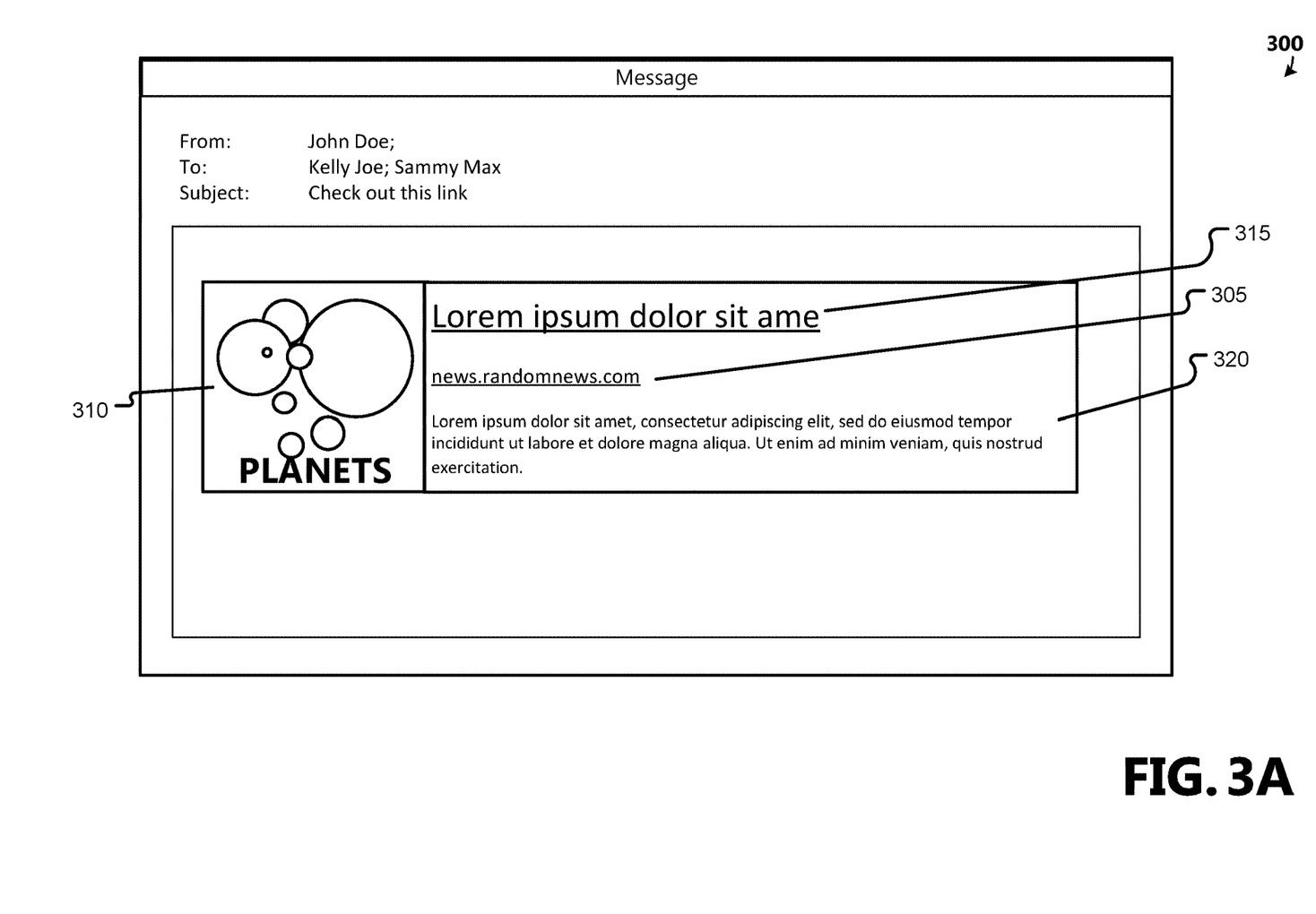
FIGS. 3A and 3B are illustrations of an example graphical user interface in which an enriched link interface is implemented.
Figure 3B:
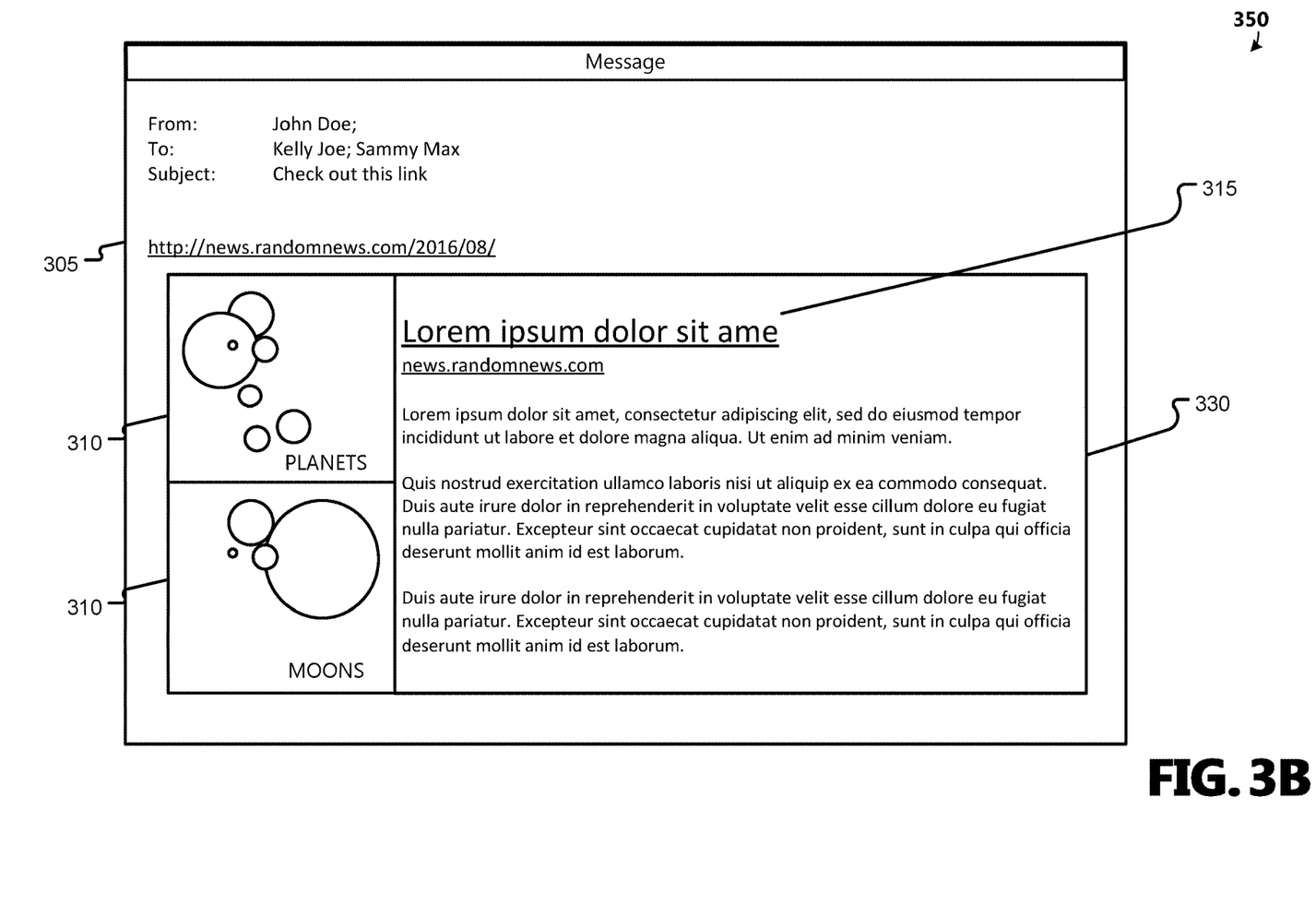

FIGS. 3A and 3B are illustrations of an example graphical user interface in which an enriched link interface 230 is implemented. The figures illustrate multiple options for providing the enriched link interface 230, including a brief enriched link interface 300 and an elaborate enriched link interface 350. Other types of enriched link interfaces 230 may be provided based on the contextually sensitive summary, such as a graphical enriched link interface or a textual enriched link interface, which provides an imaged-based contextually sensitive summary or a text-based contextually sensitive summary, respectively.

FIG. 3A illustrates an example of a brief enriched link interface 300. The illustrated brief enriched link interface 300 displays a uniform resource locator 305, an image 310, a title 315, and a brief paragraph 320 that provides a brief summary of the content item. The brief paragraph 320 may include the title of the content item and one or two lines of text that summarizes the content item. In one example, the brief paragraph 320 is a relevant paragraph in the content item, identified by the contextually sensitive summary system 110. In another example, the contextually sensitive summary system 110 parses the data from the content item referred to by the uniform resource locator 305, and creates the brief paragraph 320 to be provided via the brief enriched link interface 300.

FIG. 3B illustrates an example of an elaborate enriched link interface 350. The illustrated elaborate enriched link interface 350 displays a uniform resource locator 305, an image 310, a title 315, and an elaborate paragraph 330 summarizing the content item. In one example, the elaborate paragraph 330 is one or more relevant paragraph(s) in the content item, identified by the contextually sensitive summary system 110. In another example, the contextually sensitive summary system 110 parses the data from the content item referred to by the uniform resource locator 305, and creates the elaborate paragraph 330 to be provided via the enriched link interface 300.

Figure 4:
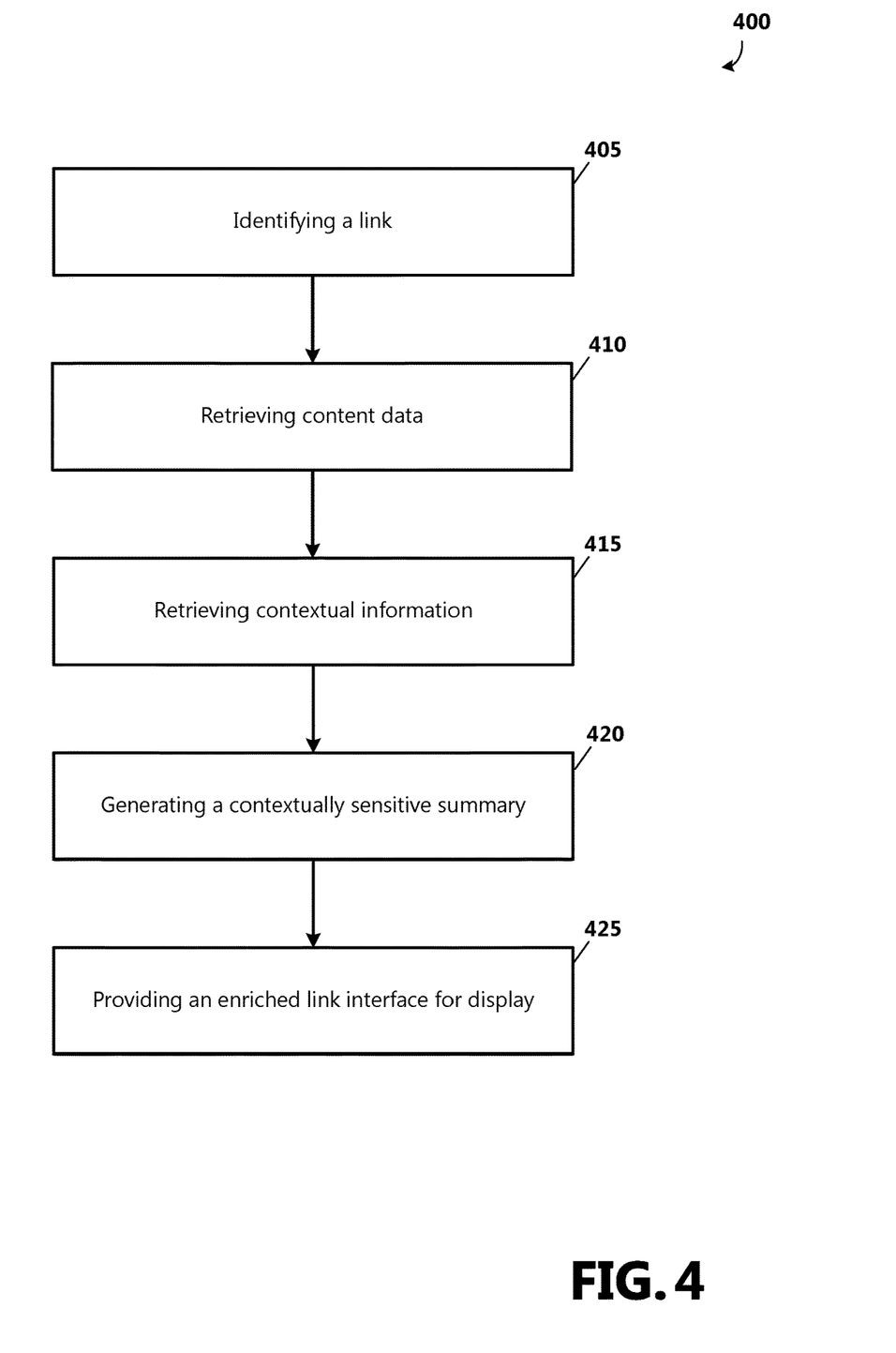
FIG. 4 is a flow chart showing general stages involved in an example method for providing an enriched link interface.

FIG. 4 is a flowchart showing general stages involved in an example method 400 of providing an enriched link interface 230.

Method 400 begins at OPERATION 405, where the system identifies a link to a content item. The link is a pointer to a content item which is accessible via a user interaction, such as, tapping, clicking, or hovering. The link may point to a content item, for example, any electronic document such as a video content item, an audio content item, a PDF file, a word processor document, a spreadsheet, a presentation file, a webpage, an image file, etc. The link may also include a reference to a specific element within a content item.

In one aspect, the link is a hyperlink to a content item on a network, such as the Internet. The hyperlink is a reference to a content item that is identified by a uniform resource locator (URL) or a web address. The hyperlink may also include hypertext, which is a text string that is displayed and identifies at least a portion of the hyperlink to a content item. The hyperlink may also be associated with an image, which is displayed and provides access to a content item. For example, the following hyperlink begins with an anchor opening tag "<a", a hyperlink reference "href=http://www.example.com>", the hypertext to be displayed "text displayed", and an anchor closing tag "</a>", such as shown below:

<a href=http://www.example.com>text displayed</a>

Since one or more features of the hyperlink are optional, the display of the hyperlink differs greatly. In one aspect, the hyperlink includes hypertext that identifies a URL. For example the hyperlink displayed as "www.example.com/presentation.ppt" provides the user with source information "example.com" and information about the content item "presentation.ppt", which is a presentation file.

In another aspect, the hyperlink includes hypertext that identifies a shortened URL. For example, the hyperlink "http://www.example.com/category1/subcategory5/content_x" is shortened to "https://ex.content" for convenience to reduce the amount of typing required, to allow the user to easily remember it, etc. Unfortunately, in this example, the link provides minimal information about the source or the content item referenced by the link.

In yet another aspect, the hyperlink includes hypertext that is arbitrary to the location of the content item. For example, a hyperlink including hypertext "click here" does not provide any information about the source or the content item.

In another example, the hyperlink is associated with an image. The displayed image may or may not provide the user with relevant information about the content item. For example, as illustrated in FIG. 2, the hyperlink 290 is displayed as an icon conveying to the user that the link may be a video content item but does not provide any information about the source or the content item itself.

Method 400 then proceeds to OPERATION 410, where the system retrieves content data from the content item. The content data may include text data, metadata, image data, a title, video content, audio content, and the like. The system may parse the content data to help the system gather relevant information to be included in the contextually sensitive summary to be provided to the user as part of the enriched link interface, as will be described with respect to OPERATIONS 420 and 425. For example, if the content item is a webpage, the system retrieves the content data such as title of the webpage, text data on the webpage, image(s) on the webpage, metadata, etc. In one aspect, the system stores the retrieved content data in a storage repository.

Method 400 then proceeds to OPERATION 415, where the system retrieves contextual information about the user. The user's contextual information includes data about the user's profile, link usage, contacts, etc. Retrieving contextual information about the user provides the system with data needed to provide an enriched link interface 230 that is customized for the user.

In one example, the system retrieves and stores communication patterns of a user. For example, the contextually sensitive summary system 110 may identify contextual data that the user frequently sends emails that includes mostly textual information. Accordingly, the contextually sensitive summary system 110 determines that the user prefers to communicate and/or receive communications that primarily include textual information. In another example, the contextually sensitive summary system 110 may identify contextual data that indicates that the user frequently sends emails that contain extensive visual information, such as images and pictures. Thus, the contextually sensitive summary system 110 may determine that the user prefers to communicate and/or receive communications that primarily include visual information.

In another aspect, the system retrieves the user's interaction data on received electronic documents. For example, the system identifies contextual data that indicate that the user frequently deletes emails including promotions and sales.

The contextually sensitive summary system 110 utilizes the user's interactions to determine that the user does not prefer accessing the emails with specific keywords, during a specific time period, or when the user is located at a specific location. For example, the system identifies that the user almost never opens emails containing "% off", which may indicate promotional emails, particularly when accessed at workplace and/or during the hours that the user is working.

In one aspect, the system identifies and retrieves the temporal aspects of the user's interaction with the link. In example, the system identifies how quickly the user accesses the link from the time of being displayed on the device. In another example, the system identifies how frequently the user accesses the link.

In another aspect, the system retrieves the user's data on link usage. Link usage identifies aspects about how the user interacts with the link. The aspects include which type of link the user interacts with. For example, the system captures the information that the user immediately deletes an email with a "click here" link with no additional information about the content item. In another example, the system identifies and retrieves that the user saves the electronic documents that includes specific keywords. For example, the user may save all emails from a particular user. In one example, the system identifies and retrieves the user's inaction to a link. For example, the system captures the contextual information that the user rarely opens a link to a video content item received with no additional information.

In one aspect, the system stores contextual information about the user in a repository and updates the data as the user's data change. For example, if the user starts accessing promotional emails received instead of deleting them without opening them, the system updates the contextual information with the updated user interaction data on received electronic documents.

Method 400 then proceeds to OPERATION 420, where the system generates a contextually sensitive summary based on the contextual information received about the user at OPERATION 415 and the content item. The contextually sensitive summary helps the user ascertain the details of the content item by providing a customized preview of the content item. The contextually sensitive summary includes various information, which include, without limitation, one or more of: images, titles, links to video content, links to audio content, and the like from the retrieved content item.

In one aspect, the contextually sensitive summary includes only images. For example, from the user's contextual information, based on the user's email sending patterns, the system learns that the user is more of a visual person who sends a lot of pictures. The system uses that information to personalize the contextually sensitive summary to include more visually appealing information which would be more interesting to the user.

In another aspect, the contextually sensitive summary includes images, a title, and a summary paragraph of the content item. For example, a contextually sensitive summary of a webpage may include one or more images associated with the webpage, a title for the webpage, and a summary paragraph of the content of the webpage. In another example, when generating a contextually sensitive summary of content item, such as a video content item referred to by an identified link, the system parses the video content item, creates a summary, locates and associates an image related to the content, and generates the contextually sensitive summary. In one example, when a sender sends an electronic mail with the link to more than one recipient such as for example a mailing list, the system may provide different contextually sensitive summaries to each of the recipients based on the recipient's retrieved contextual information.

In yet another aspect, the contextually sensitive summary system 110 is in communication with a data source 160 comprising a predictive model. It should be recognized that the data source 160 may include other forms of artificial intelligence or machine learning. In one example, the predictive model may be configured to provide information relating to the user's preferences for the contextually sensitive summary including, for example, content types, formatting, layout, etc. Further, it should be recognized that the predictive model is built and trained based on a training model that defines the contextually sensitive summary preferences models based on the observed patterns, including information relating to the user's profile data, the user's usage of links, the user's email sending patterns, the user's contacts, the user's interaction data on received electronic documents, as well as other telemetry data. The training model refines the contextually sensitive summary preferences model using a machine learning approach that verifies its accuracy using the collected contextual information as a training set to verify the accuracy of the contextually sensitive summary preference models.

In another example, the predictive model may be configured to provide the contextually sensitive summary. More specifically, the predictive model is configured to utilize the content data and the contextual information to generate one or more contextually sensitive summaries. The predictive model is built and trained based on a training model that defines the contextually sensitive summary models based on the content data and the contextual information, which refines the contextually sensitive summary to verify accuracy.

Thus, the predictive model provides one or more predictive results, such as a contextually sensitive summary preferences and/or a contextually sensitive summary, in response to receiving a respective request. Further, the predictive model may provide results based on a weighted average. For example, in response to receiving a query, the predictive model may generate multiple predictions associated with the user's contextually sensitive summary preferences and/or a contextually sensitive summary. In response to generating multiple predictions, the predictive model may present the result as a weighted average. In another example, the predictive model provides a confidence score associated with the prediction based on the differences with the multiple predictions.

Method 400 then proceeds to OPERATION 425, where the system provides an enriched link interface 230 for display on the user's device. The enriched link interface 230 provides the user with the customized preview of the content item before having the user actually access the content via the link. In one aspect, the enriched link interface 230 includes the link and the contextually sensitive summary. In another aspect, the enriched link interface provides the user with sufficient details in the user's preferred format, without the user having to access the content item, thereby saving network bandwidth. In a further aspect, by viewing the enriched link interface 230, the user can ascertain what the content item includes and make the determination if and when the user would like to access the entire content item via the link.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
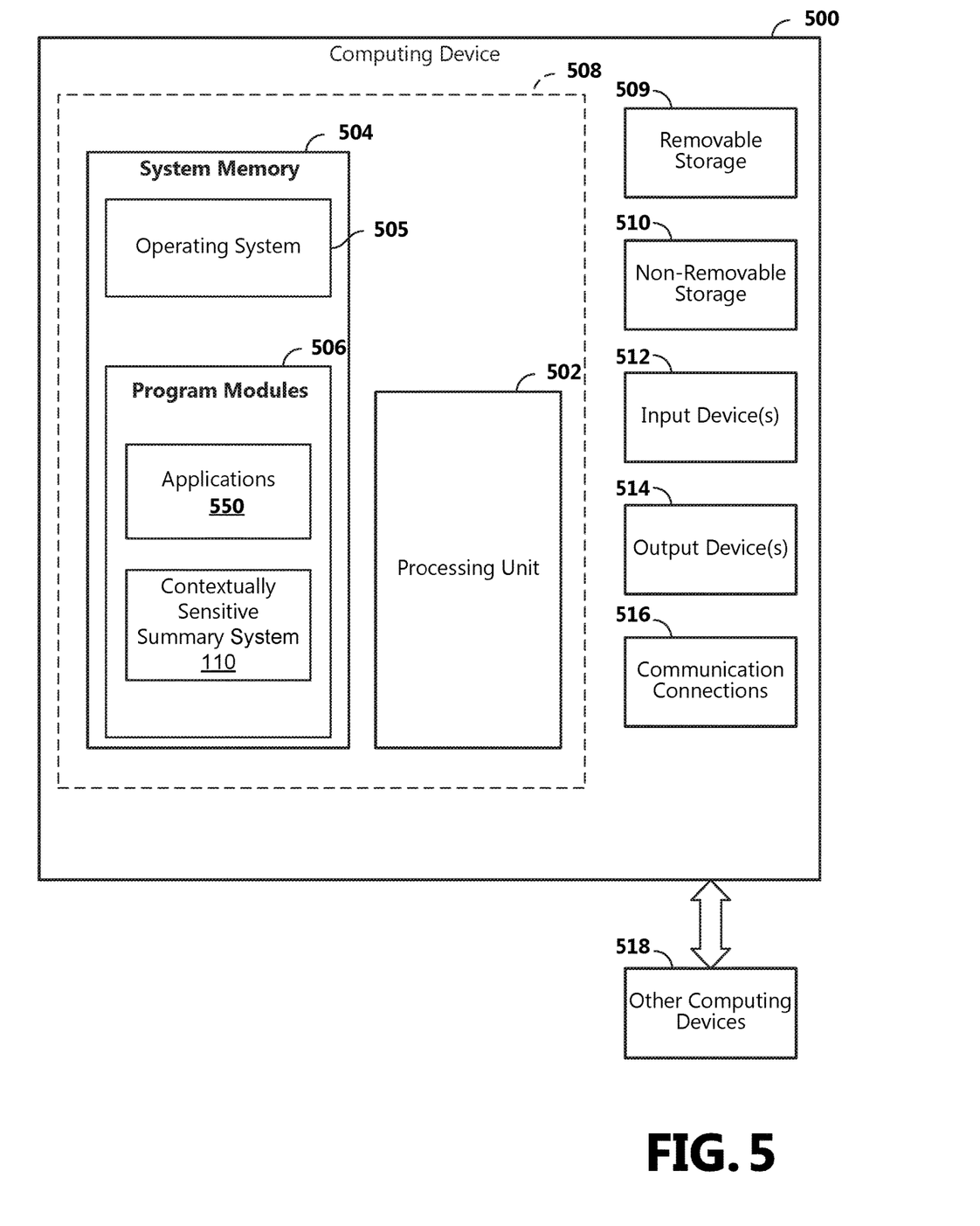
FIG. 5 is a block diagram illustrating example physical components of a computing device.
Figure 6A:
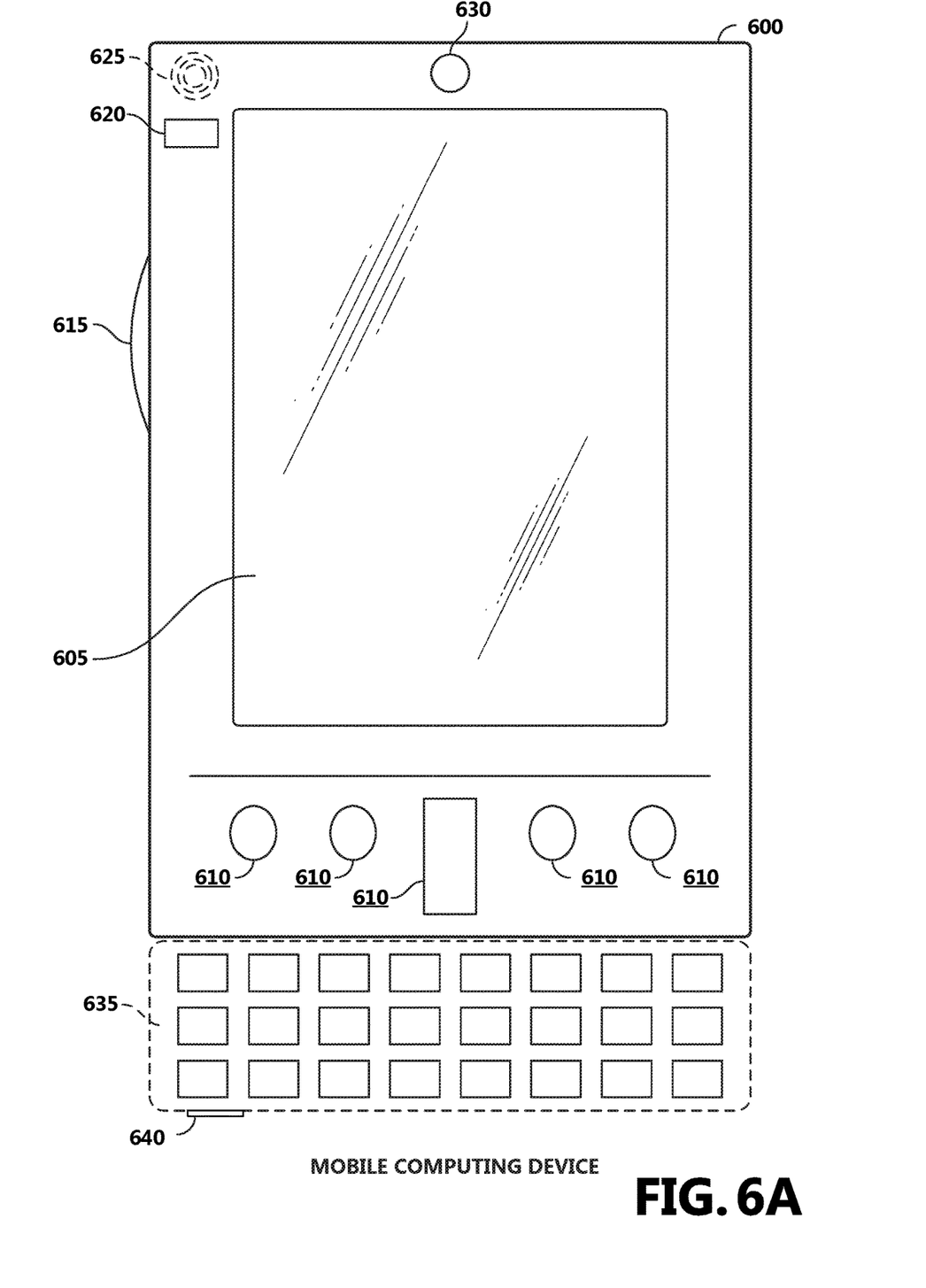
FIGS. 6A and 6B are block diagrams of a mobile computing device.
Figure 6B:
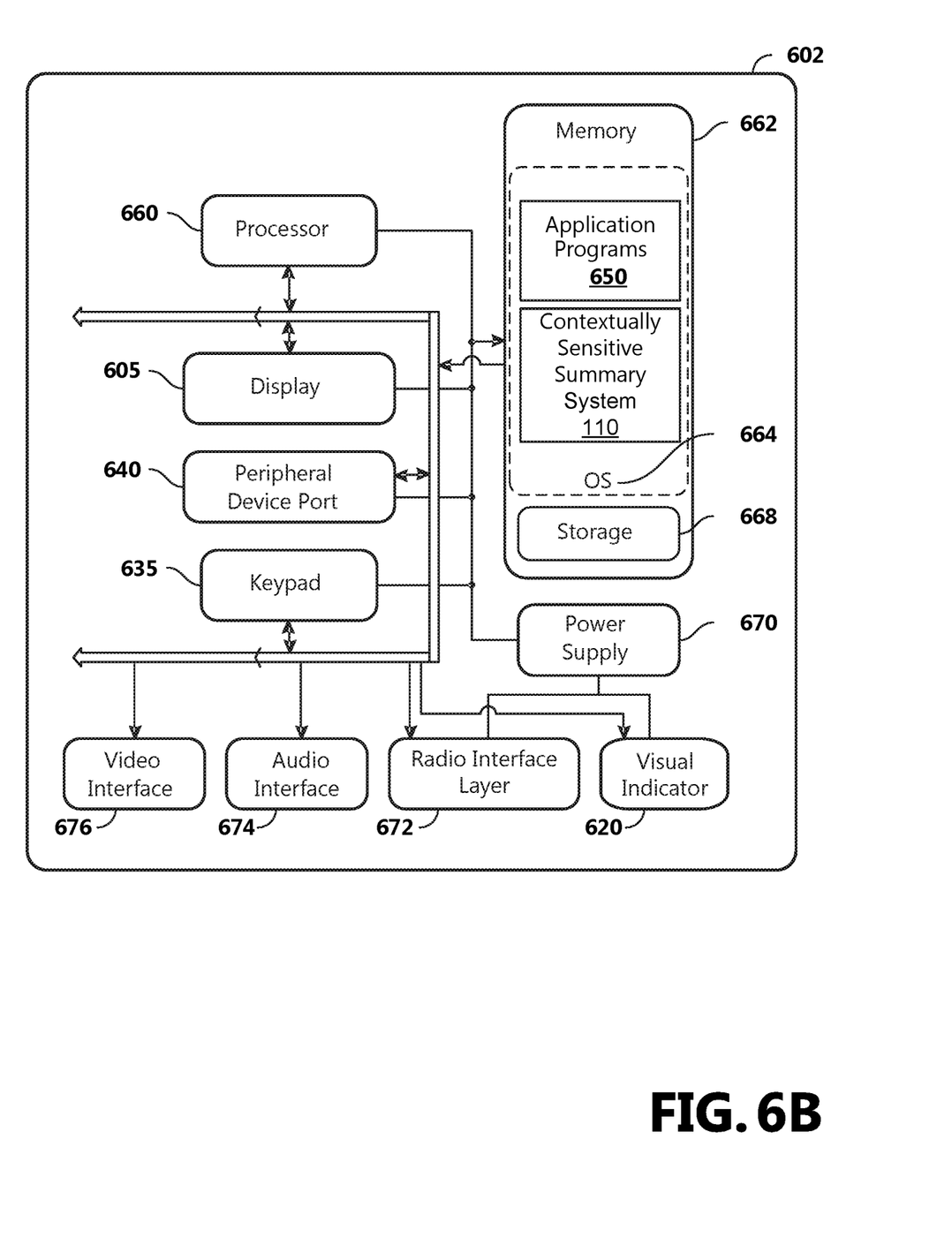
Figure 7:
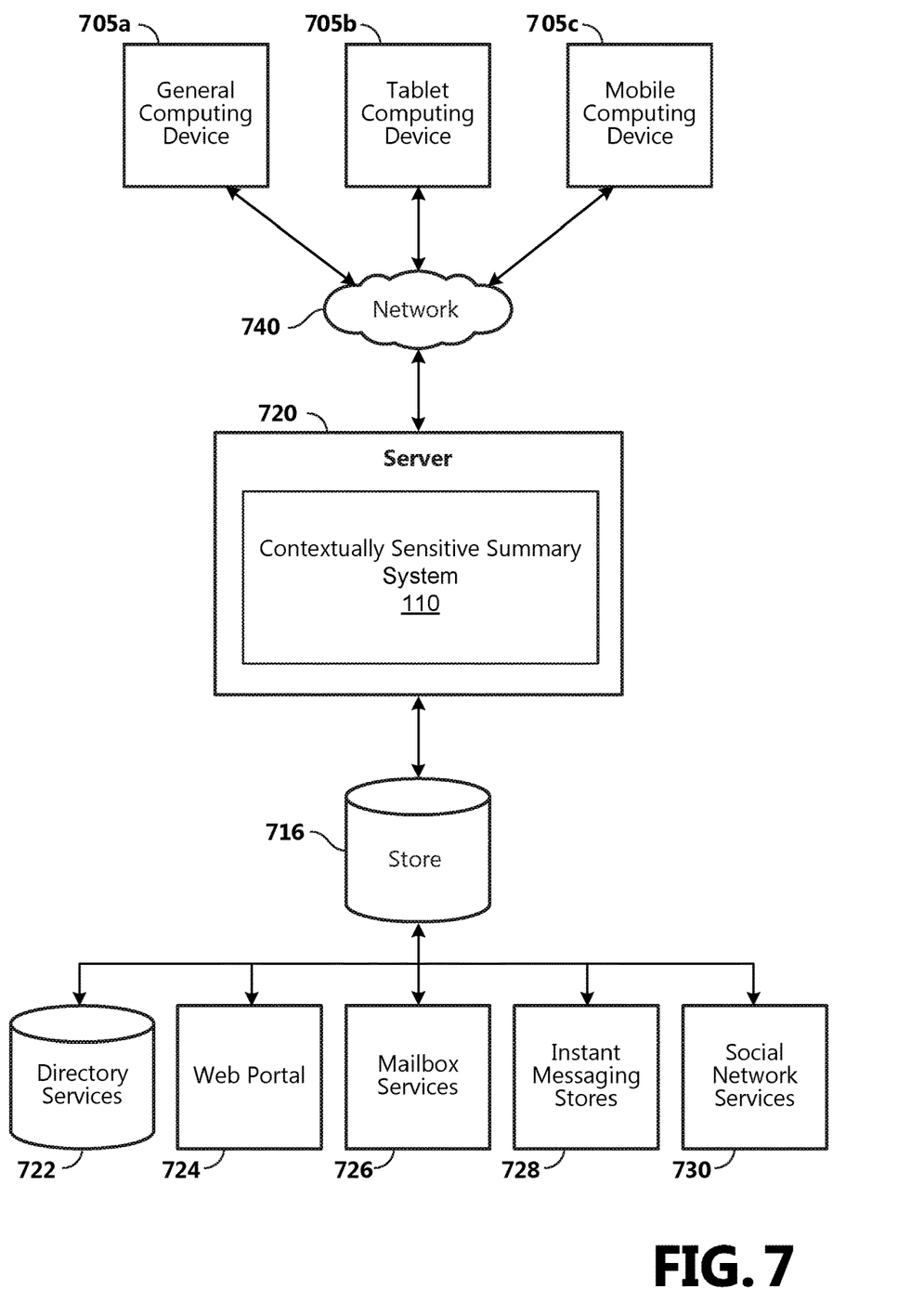
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes contextually sensitive summary system 110. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., contextually sensitive summary system 110) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500.

According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, communication clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, contextually sensitive summary system 110 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for providing an enriched link interface as described above. Content developed, interacted with, or edited in association with the contextually sensitive summary system 110 is enabled to be stored in different communication channels or other storage types. For example, various documents may be stored using a directory service 722, a web portal 724, a mailbox service 726, an instant messaging store 728, or a social networking site 730. The contextually sensitive summary system 110 is operative to use any of these types of systems or the like for providing an enriched link interface, as described herein. According to an aspect, a server 720 provides the contextually sensitive summary system 110 to clients 705 a, b, c. As one example, the server 720 is a web server providing the contextually sensitive summary system 110 over the web. The server 720 provides the contextually sensitive summary system 110 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing an enriched link interface, comprising:
   identifying a link to a content item in a communication transmitted from a sender to a recipient;
   retrieving content data from the content item;
   retrieving contextual information about the recipient, the contextual information including communication patterns of the recipient that identify a preferred content type of the recipient for communications and link-related interaction data that identifies an interaction of the recipient with different types of links;
   generating a contextually sensitive summary that includes a portion of the content data customized for the recipient based on the contextual information including the communication patterns and the link-related interaction data; and
   providing for display to the recipient an enriched link interface within the communication, the enriched link interface including the contextually sensitive summary for the content item.

2. The method of claim 1, wherein the enriched link interface is a brief enriched link interface that provides a brief contextually sensitive summary of the content item.

3. The method of claim 2, wherein the brief contextually sensitive summary includes a paragraph in the content item that is selected based on the contextual information about the recipient.

4. The method of claim 2, wherein the brief contextually sensitive summary is generated by parsing the content data from the content item and creating the brief contextually sensitive summary based on the parsed content data and the contextual information about the recipient.

5. The method of claim 1, wherein the enriched link interface is an elaborate enriched link interface that provides an elaborate contextually sensitive summary of the content item.

6. The method of claim 5, wherein the elaborate contextually sensitive summary includes multiple paragraphs in the content item that are selected based on the contextual information about the recipient.

7. The method of claim 5, wherein the elaborate contextually sensitive summary is generated by parsing the content data from the content item and creating the elaborate contextually sensitive summary based on the parsed content data and the contextual information about the recipient.

8. The method of claim 1, wherein the enriched link interface comprises a plurality of images that provides a summary of the content item.

9. The method of claim 1, wherein the enriched link interface includes the link to the content item.

10. The method of claim 1, wherein the contextual information further includes profile data associated with the recipient and the recipient's contacts data.

11. A system for providing an enriched link interface, comprising:
   a processing unit; and
   a memory including computer readable instructions, which when executed by the processing unit, causes the system to be operable to:
      identify a link to a content item in a communication transmitted from a sender to a recipient;

retrieve content data from the content item;
retrieve contextual information about the recipient, the contextual information including communication patterns of the recipient that identify a preferred content type of the recipient for communications and link-related interaction data that identifies an interaction of the recipient with different types of links;
generate a contextually sensitive summary that includes a portion of the content data customized for the recipient based on the contextual information including the communication patterns and the link-related interaction data; and
provide for display to the recipient an enriched link interface within the communication, the enriched link interface comprising the contextually sensitive summary and the link to the content item.

12. The system of claim 11, wherein the enriched link interface is a brief enriched link interface that provides a brief contextually sensitive summary of the content item, the brief contextually sensitive summary including a paragraph in the content item that is selected based on the contextual information about the recipient.

13. The system of claim 12, wherein the brief contextually sensitive summary is generated by parsing the content data from the content item and creating the brief contextually sensitive summary based on the parsed content data and the contextual information about the recipient.

14. The system of claim 11, wherein the enriched link interface is an elaborate enriched link interface that provides an elaborate contextually sensitive summary of the content item, the elaborate contextually sensitive summary including multiple paragraphs in the content item that are selected based on the contextual information about the recipient.

15. The system of claim 14, wherein the elaborate contextually sensitive summary is generated by parsing the content data from the content item and creating the elaborate contextually sensitive summary based on the parsed content data and the contextual information about the recipient.

16. The system of claim 11, wherein the enriched link interface comprises a plurality of images that provides a summary of the content item.

17. The system of claim 11, wherein the contextual information further includes profile data associated with the recipient and the recipient's contacts data.

18. A computer readable storage device including computer readable instructions, which when executed by a processing unit, performs steps for providing an enriched link interface, comprising:
identifying a link to a content item in a communication transmitted from a sender to a recipient;
retrieving content data from the content item;
retrieving contextual information about the recipient, the contextual information including communication patterns of the recipient that identify a preferred content type of the recipient for communications and link-related interaction data that identifies an interaction of the recipient with different types of links;
generating a contextually sensitive summary that includes a portion of the content data customized for the recipient based on the contextual information including the communication patterns and the link-related interaction data; and
providing for display to the recipient an enriched link interface within the communication, the enriched link interface including the link to the content item and the contextually sensitive summary for the content item.

19. The method of claim 1, further comprising:
based on the preferred content type of the recipient for communications being identified as one of visual information or textual information, customizing the portion of the content data to include the one of visual information or textual information in the contextually sensitive summary.

20. The method of claim 1, wherein the different types of links are associated with an amount of information the respective links provide about content items referenced by the links and sources thereof.

* * * * *